Patented May 26, 1931

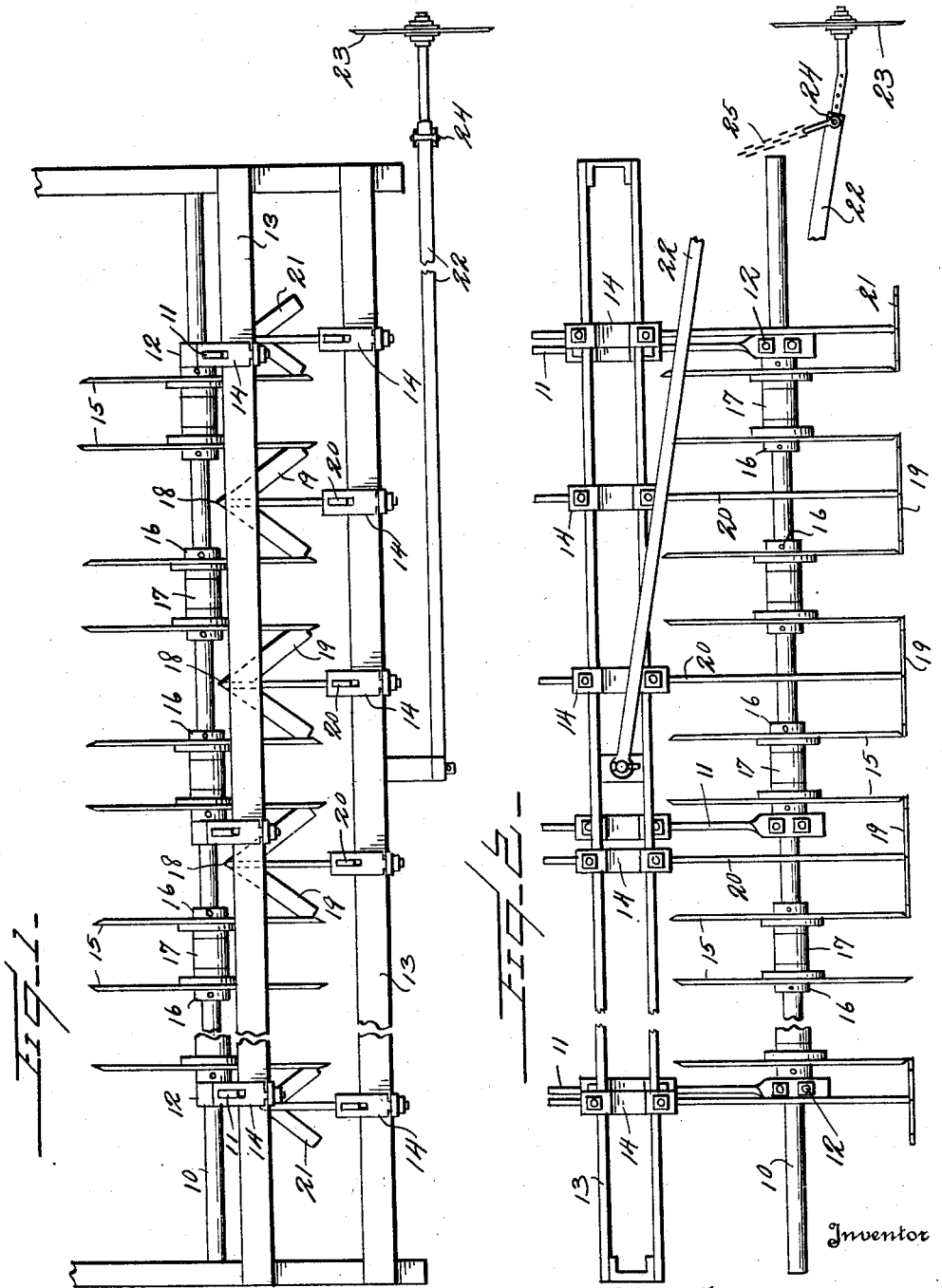

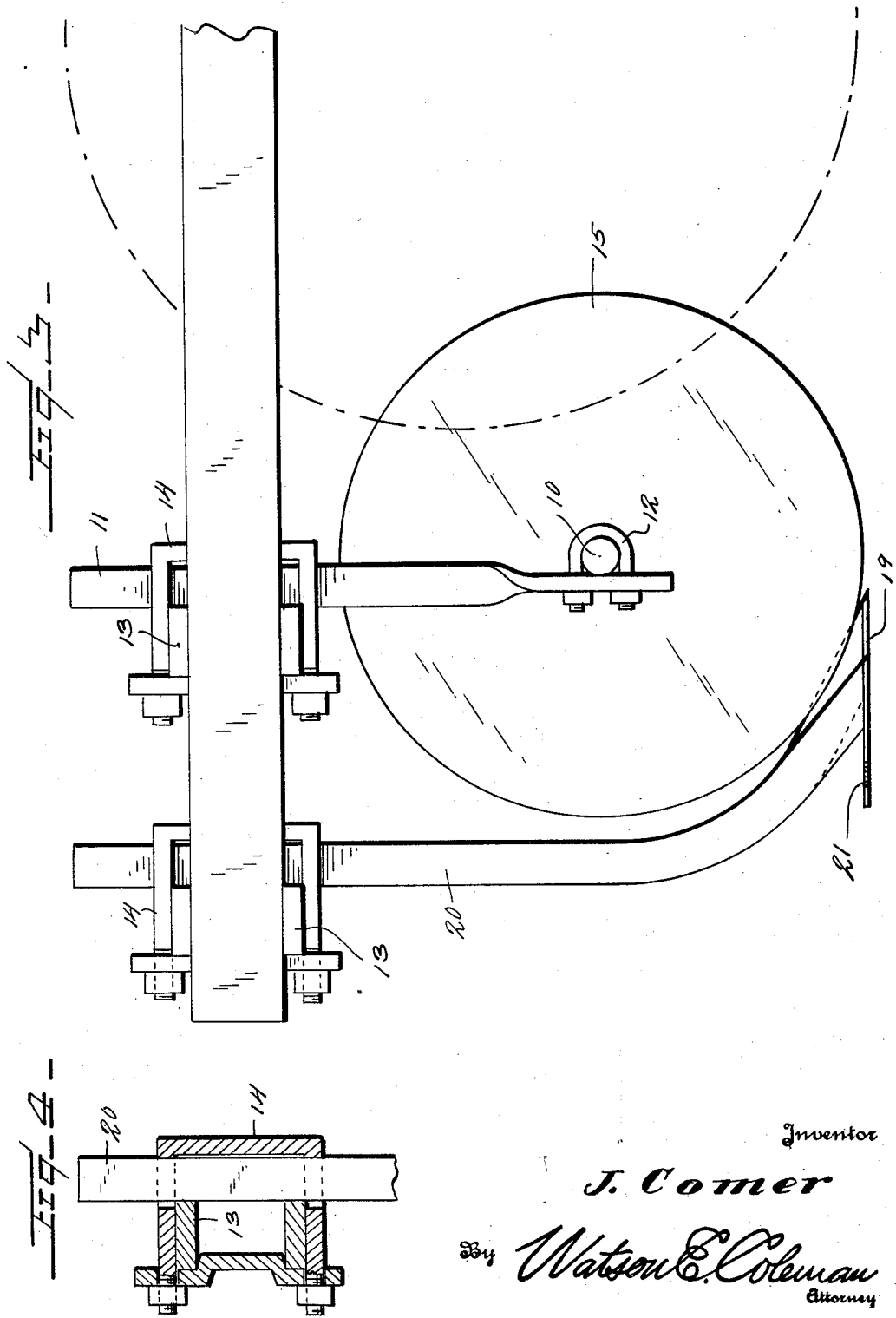

1,807,511

UNITED STATES PATENT OFFICE

JOHN COMER, OF WINDSOR, COLORADO

BEET BLOCKER

Application filed July 1, 1930. Serial No. 465,212.

This invention relates to agricultural implements and particularly to means for blocking out or thinning out beets. At the time of planting beets in the spring, they are thickly sown in rows and allowed to start growing and when a certain degree of growth is attained, the process of blocking is necessary which up to the present has been performed by hand labor. This blocking consists in going between the rows and with the use of a hoe, hoeing out an eight inch space between the four inch hills of beets. This is necessary in order to give the beets sufficient ground in which to grow and expand.

Furthermore plants originally thickly set in the rows would lack nourishment, and it is necessary, therefore, to thin them out sufficiently so that they can fully mature and produce maximum tonnage per acre.

The object of the present invention is to provide a beet blocker of a very simple construction which may be attached to any of the ordinary beet cultivators now in use, which may be readily detached therefrom, and which will speed up this very necessary operation of blocking out the beets and secure a very great saving in the cost of cultivation.

A further object is to provide a beet blocker of this character having pairs of colters, the colter of each pair being spaced apart a distance equal to the beets to be left, each pair being spaced from an adjacent pair a distance equal to the distance to be cut out in the beet row and to provide rearwardly diverging cutters or "duckfeet" disposed between the pairs of colters by which to cut out the discarded beets, the colters acting to protect the retained beets from any damage by the "duckfeet" and prevent these duckfeet or colters from pulling the earth or breaking the earth away from the retained beets.

Another object is to provide very simple means whereby this blocker may be attached to a cultivator and whereby the colters and "duckfeet" may be adjusted and whereby a marker may be supported in conjunction with the blocker.

Other objects will appear in the course of the following description.

My invention is illustrated in the accompanying drawings, wherein:—

Figure 1 is a top plan view of a beet blocker constructed in accordance with my invention;

Figure 2 is a rear elevation thereof;

Figure 3 is a fragmentary side elevation showing part of the colter and the blocker attachment applied thereto;

Figure 4 is an enlarged section through one of the frame bars of the cultivator and the pin holding one of the shanks in place.

Referring to these drawings, 10 designates an axle supported upon vertical shanks 11 of any suitable character and adapted to fit tool clamps on the ordinary cultivator. The axle is shown as being held in place upon the shanks and against rotation by U-bolts 12. The cultivator tool bar is designated 13 and the clamps whereby the shanks 11 are held to the cultivator tool bar are designated 14. Slidably mounted upon the axle 10 are a plurality of pairs of colters designated 15, the colters of each pair being spaced from each other preferably a distance of four inches.

The colters of each pair of colters are spaced from each other by means of tubular spacers 17 and the colters are held against these spacers by collars 16 provided with set screws. There is preferably a space of eight inches between the pairs of colters and each pair of colters is spaced from each other, as I have stated before a distance of preferably four inches. While I do not wish to be limited to this spacing, this has been found in practice to be the best spacing that can be used. With my construction the pairs of colters may be spaced from each other different distances or the colters of each pair may be spaced different distances from each other for the reason that the colters are longitudinally shiftable upon the fixed shaft and held in place between the collars 16 and the spacers 17.

Disposed between the pairs of colters and operating just behind the colters is a divergently bladed cutting knife 18 ordinarily known as a "duckfoot". This has the rearwardly divergent blades 19 and an upwardly extending shank 20. The blades 19 are sufficiently long as to extend just beneath the colters or just to the cut formed by the colters.

The shanks 20 are held upon the colter tool bar 13 by means of the usual tool bar clamps 14, previously referred to. At each end of the assembly there is disposed a "duckfoot" designated generally 21 having rearwardly diverging blades the rear ends of which are spaced about five inches apart where the duck feet 19 have blades spaced at their rear ends about eight inches apart. Each of the duck feet 21 has an upwardly extending shank engaged with the cultivator tool bar in the manner previously stated. Pivotally mounted upon the cultivator tool bar 13 is the marker shank 22 having at its extremity the marking disk 23 and provided with the clevis 24. This clevis 24 is connected to a chain 25 extending upward to the cultivator tool bar. Preferably the shank 22 is formed in two longitudinally adjustable sections as illustrated in Figure 4.

In the operation of this blocker, the eight inch "duckfeet" 18 will cut all the beets in the eight inch space between each pair of rolling colters and cut away also any foreign growth, thereby facilitating the growth and expansion of the retained beets in the four inch space left by the spacing between the rolling colters. It is to be understood that this machine is to be run cross-wise of the rows of beets. The purpose of the five inch or relatively narrow "duckfeet" 21 is that while making one circuit with the blocker, a five inch space is cleared and upon the return circuit of the blocker, by the use of the marker 23, the eight inch clearing of plant growth is attained by the return of the five inch "duckfoot" on the opposite end of the frame in passing. The pairs of colters are movable and adjustable on the axle as stated, but the best results are secured by the spacing of four inches between the colters of each pair and the spacing of eight inches between the pairs of colters.

I claim :—

1. A beet blocker attachment for cultivators comprising an axle, means for detachably supporting the axle upon a cultivator bar, a plurality of pairs of rolling colters mounted upon the axle, each colter being longitudinally movable upon the axle, a spacer disposed between the colters of each pair, collars holding the colters in place against the spacers and engaged with the axle, the pairs of colters being disposed in spaced relation to each other along the axle, a plurality of cutters disposed each between a pair of colters, each cutter having rearwardly divergent blades, the extremities of which are disposed behind and on a level with the lowest portion of the adjacent colters, each cutter having a shank extending upward and adapted to be detachably engaged with the cultivator tool bar.

2. A beet blocker attachment for cultivators including a fixed axle, a plurality of pairs of rolling colters mounted upon the axle and for rotation thereon, the colters being shiftable upon the axle, the colters of each pair being spaced a predetermined distance from each other and the pairs of colters being uniformly spaced upon the axle, spacers disposed upon the axle and spacing the pairs of colters with relation to each other, collars adjustably fixed upon the axle and bearing against the outside faces of the colters of each pair and forcing them against the spacers, means for supporting the axle from a cultivator tool bar and a plurality of rearwardly divergent cutters, each disposed between two pairs of colters and each having rearwardly divergent blades extending to the adjacent colters, each cutter having a shank extending upwardly and having means whereby it may be attached to a cultivator tool bar, relatively narrow cutters disposed exterior to the outermost colters of the series of colters and having a width less than the cutters disposed between the pairs of colters and each having a shank adapted to be adjustably connected to the tool bar of the cultivator.

3. The combination with a cultivator having a pair of parallel transversely extending tool bars, of a blocking attachment comprising an axle, supports for the axle extending upward therefrom and detachably engaged with the forward tool bar, the colters being arranged in pairs, and the pairs of colters being uniformly spaced on the axle, the spaces between the colters of each pair being less than the spaces between the pairs of colters, cutters disposed in the spaces between each pair of colters, the cutters having rearwardly divergent blades, the rear extremities of which are spaced apart a distance equal to the spacing between the pairs of colters, each cutter having a shank extending upward and detachably engaged with the rearmost tool bar, and cutters having rearwardly diverging blades disposed at the ends of the series of colters and having shanks extending upward and engaged with the rear tool bar.

In testimony whereof I hereunto affix my signature.

JOHN COMER.